United States Patent [19]

Glaser et al.

[11] 4,267,092

[45] May 12, 1981

[54] FILLER COMPOSITION COMPRISING A FILLER AND AN AQUEOUS BINDER RESIN EMULSION COMPRISING A QUICK DRYING POLYMER EMULSION AND A FLEXIBLE POLYMER EMULSION

[75] Inventors: Denis V. Glaser, London; Norman Heeley, Hitchin, both of England

[73] Assignee: Polycell Products Limited, Hertfordshire, England

[21] Appl. No.: 50,608

[22] Filed: Jun. 21, 1979

[30] Foreign Application Priority Data

Jun. 23, 1978 [GB] United Kingdom ............... 27782/78

[51] Int. Cl.$^3$ ............................................... C08L 33.08
[52] U.S. Cl. ........................ 260/29.6 RB; 260/29.6 S
[58] Field of Search ................... 260/29.6 RB, 29.6 S

[56] References Cited

U.S. PATENT DOCUMENTS

| | | | |
|---|---|---|---|
| 3,421,277 | 1/1969 | Frischmuth | 260/29.6 RB |
| 3,883,489 | 5/1975 | Matschke et al. | 260/29.6 RB |
| 4,018,732 | 4/1977 | Lakshmanan | 260/29.6 RB |
| 4,042,555 | 8/1977 | Raimondi et al. | 260/29.6 RB |

*Primary Examiner*—Maurice J. Welsh
*Attorney, Agent, or Firm*—Larson, Taylor and Hinds

[57] ABSTRACT

A filler composition consists of 60 to 85% by weight of silica, dolomite and/or calcite of size below 150 $\mu$m and of average size above 20 $\mu$m, and 40 to 15% by weight of an aqueous emulsion of 40 to 70% solids of a resin binder mixture comprising a quick drying polymer emulsion having a minimum film forming temperature above 5° C. and a flexible polymer emulsion having a minimum film forming temperature below 5° C., the polymer in the emulsion of minimum film forming temperature above 5° C. constituting 60 to 90% by weight of the total polymer in the emulsions.

6 Claims, No Drawings

FILLER COMPOSITION COMPRISING A FILLER AND AN AQUEOUS BINDER RESIN EMULSION COMPRISING A QUICK DRYING POLYMER EMULSION AND A FLEXIBLE POLYMER EMULSION

BACKGROUND OF THE INVENTION

This invention relates to filler compositions and in particular to compositions for filling cracks, repairing faulty plasterwork, filling blemishes in woodwork and other similar applications.

Where the filler is to be used for woodwork, e.g. for restoring damaged window frames, it is desirable that the filler composition, after setting, should be flexible so that it can move with the wood with changes in temperature and humidity. The filler should also be nonshrinking so that on drying, or curing, the composition, a gap or crack does not appear between the filler and the surrounding surfaces or in the filler composition itself. Furthermore, the filler composition should be easily applied and easy to shape after setting, for example by woodworking tools and glasspaper.

Heretofore attempts to satisfy these desiderata have been hampered in that one desirable property has generally had to be sacrificed in order to achieve another property.

STATEMENT OF THE INVENTION

We have now divised a filler composition improved in the sense of meeting better the desiderata stated above.

Accordingly we provide a filler composition comprising (i) 60 to 85% by weight of a particulate filler selected from the mineral group consisting of silica, dolomite, and calcite, or mixtures thereof, said particulate filler being of such particle size that at least 95% by weight of the filler passes a 150 μm sieve, at least 50% by weight passes a 53 μm sieve, and having a weight average particle size of at least 20 μm, and not greater than 100 μm, and correspondingly (ii) 40 to 15% by weight of an aqueous binder resin emulsion of solids content 40 to 70% by weight, said binder resin emulsion comprising (a) a quick drying polymer emulsion having a minimum film gorming temperature above 5° C. and (b) a flexible polymer emulsion having a minimum film forming temperature below 5° C., the amount of polymer in said emulsion of minimum film forming temperature above 5° C. being 60 to 90% by weight of the total weight of the polymers in said emulsions.

The filler composition thus comprises one or more particulate fillers in admixture with a mixture of two aqueous binder resin emulsions with critically balanced ranges of constituents.

The particulate filler has a particle size such that substantially all of it, i.e. at least 95% by weight, passes through a 150 μm sieve while at least 50% by weight passes a 53 μm sieve. The particulate filler identified above is relatively fine and this enables the product composition to penetrate narrow cracks such as hairline cracks in plaster and woodwork and, with the identified binder resin emulsion, enables the composition to be applied by means of a knife or trowel to a fine finish. On the other hand the particulate filler must not be too fine as it would then require more binder resin to obtain a product composition of acceptable consistency and the resultant composition would tend to crack. If the amount of binder resin were not increased the product composition would be too dry to apply satisfactorily and would give a dusty, crumbly product and would not be resistent to weathering if used externally such as to repair brickwork or concrete. If the binder resin emulsion is low and the weight average particle size is low then the composition becomes both insufficiently flexible or insufficiently weather resistant. If slower drying resins are used then the composition shows a marked tendency to sink, shrink or crack.

Dolomite is the preferred filler either alone or in admixture with up to 25% by weight of silica or, more preferably, calcite.

It is not necessary in such mixtures of particulate fillers that each component should have a weight average particle size of at least 20 μm or that at least 50% by weight will pass a 53 μm sieve. However the mixture of particulate fillers must satisfy these criteria. Hence it is possible, for example, to use a coarser calcite in admixture with a fine dolomite.

It is stated that the polymer emulsion having a minimum film forming temperature below 5° C. has to be flexible. By "flexible" we mean that a film cast from the resin emulsion must have an elongation at break of at least 500%. This is conveniently assessed by drawing a dumb-bell shaped specimen at room temperature at a rate of 3.2 mm/minute on a Hounsfield Tensometer.

The minimum film forming temperature is the minimum temperature at which an integrated film can be formed from the resin emulsion. The minimum film forming temperature is related to the glass transition temperature, Tg, of the resin but also depends on other factors such as the resin particle size in the emulsion and the surface tension of the emulsion.

DESCRIPTION OF THE INVENTION

The resins are preferably homopolymers or copolymers of ethylenically unsaturated monomers, for example olefins, such as ethylene, propylene; unsaturated carboxylic acids and alkyl esters thereof, for example acrylic, methacrylic, itaconic, fumaric and maleic acids, methyl acrylate, ethyl acrylate, n-butyl acrylate, methyl methacrylate, 2-ethyl hexyl acrylate, n-butyl methacrylate, di-n-butyl maleate, di-n-butyl fumarate, and n-lauryl methacrylate; vinyl and vinylidene halides, for example vinyl chloride and vinylidene chloride; vinyl esters of carboxylic acids, for example vinyl acetate, vinyl proprionate, and the vinyl esters of mixed tertiary $C_{10}$ carboxylic acids; butadiene and isoprene; acrylonitrile and methacrylonitrile; and styrene and vinyl toluene.

In addition to having the specified minimum film forming temperatures, the resin emulsions must be quick drying when mixed with particulate filler so that the composition will set rapidly and so can be sanded down, painted etc. without undue delay after application to the substrate to be filled. A suitable test for assessing the rate of drying is as follows:

The solids content of the resin emulsion under test is adjusted to 50% and then 300 g of the emulsion is mixed with 1200 g of a particulate filler consisting of calcite having the following particle size distribution:

99% by weight of particles less than 212 μm
87% by weight of particles less than 150 μm
53% by weight of particles less than 106 μm
30% by weight of particles less than 75 μm
22% by weight of particles less than 63 μm
17% by weight of particles less than 53 μm 11% by weight of particles less than 45 μm (weight average particle size 102 μm (N.B. This filler is not suitable for use as the sole particulate filler in the final composition as it is too coarse. However it gives a useful indication of the drying characteristics of the final product).

An aluminium dish of 57 mm diameter is then filled to a depth of 11 mm with the composition and the surface levelled off and left to dry at ambient temperature and 50% relative humidity. After 72 hours the hardness of the composition is assessed by applying a 2 kg load for 1 minute via a 19 mm diameter steel ball to the centre of the surface of the composition in the dish using a penetrometer. If the identation is less than 1 mm the resin emulsion is considered to be quick drying.

The rate of drying of the resin is largely governed by the nature of the emulsion stabiliser employed: thus surfactant stabilised emulsions tend to dry much faster than colloid stabilised emulsions.

Examples of suitable binder resins having a minimum film forming temperature above 5° C. include surfactant stabilised styrene/2-ethyl hexyl acrylate copolymer emulsions containing 40 to 50% by weight of 2-ethyl hexyl acrylate units. Examples of suitable binder resins that are flexible and have a minimum film forming temperature below 5° C. include surfactant stabilised vinyl acetate/dibutyl maleate copolymer emulsions containing about 40% by weight of dibutyl maleate units.

The amount of first binder resin is 60 to 90% by weight, based on the total dry weights of the binder resins. If more than 90% of the first binder resin is employed, the filler composition will have insufficient flexibility while if less than 60% is used, the filler composition will have inadequate water resistance and would be liable to cracking when exposed to humid conditions.

The binder resins are used in the form of aqueous emulsions. The solids content of the binder resin emulsion should be 40 to 70% by weight, preferably 45–60% by weight.

The filler composition contains 60 to 85% by weight of the particulate filler and in particular 75 to 80% by weight of particulate filler.

The composition may also contain conventional additives such as thickeners such as polyacrylates or polyvinyl alcohol, dispersing agents such as ammonium poly acrylate, biocides and antifoaming agents. The total amount of such additional ingredients will generally be less than 1% by weight of the filler composition.

The invention is illustrated by the following example in which all parts and percentages are expressed by weight.

A filler composition was made by first mixing together 16 parts of a first binder resin comprising a quick drying (indentation after 72 hours: 0.3 mm) aqueous emulsion of solids content 55% of a styrene/2-ethyl hexyl acrylate copolymer containing 45% by weight of 2-ethyl hexyl acrylate units having a minimum film forming temperature of 10° C. with 5 parts of a second binder resin comprising an aqueous emulsion of solids content 55% of a vinyl acetate/dibutyl maleate copolymer containing 40% by weight of dibutyl maleate units having a minimum film forming temperature of between 0° and 2° C., and anelongation at break of 630%. Both aqueous emulsions were stabilised with anionic surfactants.

To this mixture there was added 0.1 part of a polyacrylate dispersing agent, 0.6 part of a biocide and 0.02 parts of an antifoaming agent.

Thereafter 63 parts of dolomite and 16 parts of calcite were mixed together and added to the binder emulsion mixture.

The dolomite had an average particle size of 36 μm and 85% passed a 53 μm sieve. The calcite was coarser, having an average particle size of 102 μm with only 17% passing a 53 μm sieve. 97.5% of the mixture of dolomite and calcity passed a 150 μm sieve and 79% passed a 53 μm sieve. The average particle size of the mixture of dolomite and calcity was 38 μm.

The filler composition could be applied by knife into cracks in plaster of less than 1 mm width and, after drying, which occurred within 2 hours under normal indoor conditions of temperature and humidity, could be easily sanded down. Even after exposure to humid conditions, the filler showed no sign of cracking or shrinking. The filler could equally easily be applied to fill cracks in woodwork.

What we claim is:

1. A filler composition comprising, (i) 60 to 85% by weight of a particulate filler selected from the mineral group consisting of silica, dolomite and calcite, or mixtures of any thereof, said particulate filler being of such particle size that at least 95% of the filler passes a 150 μm sieve, at least 50% by weight passes a 53 μm sieve, and having a weight average particle size of at least 20 μm, and correspondingly (ii) 40 to 15% by weight of an aqueous binder resin emulsion of solids content 40 to 70% by weight, said binder resin emulsion comprising (a) a quick drying polymer emulsion having a minimum film forming temperature above 5° C. and (b) a flexible polymer emulsion having a minimum film forming temperature below 5° C., the amount of polymer in said emulsion of minimum film forming temperature above 5° C. being 60 to 90% by weight of the total weight of the polymers in said emulsions, said composition being hardenable to provide a crack-and-weather-resistant finish which can be abraded, for example by sanding.

2. A filler composition according to claim 1 wherein the particulate filler is dolomite alone or in admixture with up to 25% by weight, based on the total weight of particulate filler, of silica or calcite.

3. A filler composition according to claim 1 or claim 2 wherein the composition contains 75 to 80% by weight of the particulate filler.

4. A filler composition according to any one of claims 1 to 3 wherein the binder resin emulsion has a solids content of 45 to 60% by weight.

5. A filler composition according to any one of claims 1 to 4 wherein the quick drying polymer emulsion is a surfactant stabilised emulsion of a styrene/2-ethyl hexyl acrylate copolymer containing 40 to 50% by weight of 2 ethyl hexyl acrylate units.

6. A filler composition according to any one of claims 1 to 5 wherein the flexible polymer emulsion is a surfactant stabilised emulsion of a vinyl acetate/dibutyl maleate copolymer containing about 40% by weight of dibutyl maleate units.

* * * * *